(12) United States Patent
Lombardi et al.

(10) Patent No.: US 9,712,749 B2
(45) Date of Patent: Jul. 18, 2017

(54) ELECTRONIC DEVICE HAVING MULTIPLE SIDES

(71) Applicant: Motorola Mobility LLC, Chicago, IL (US)

(72) Inventors: Michael J Lombardi, Lake Zurich, IL (US); John Gorsica, Round Lake, IL (US); Amber M Pierce, Evanston, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 14/219,160

(22) Filed: Mar. 19, 2014

(65) Prior Publication Data

US 2015/0244940 A1 Aug. 27, 2015

Related U.S. Application Data

(60) Provisional application No. 61/945,595, filed on Feb. 27, 2014.

(51) Int. Cl.
*H04N 5/232* (2006.01)
*G06F 3/147* (2006.01)
*G06F 3/0484* (2013.01)
*G06F 3/0488* (2013.01)

(52) U.S. Cl.
CPC ..... *H04N 5/23293* (2013.01); *G06F 3/04842* (2013.01); *G06F 3/04847* (2013.01); *G06F 3/04886* (2013.01); *G06F 3/147* (2013.01); *H04N 5/23219* (2013.01); *G09G 2340/0464* (2013.01); *G09G 2340/0492* (2013.01); *G09G 2340/14* (2013.01); *G09G 2380/02* (2013.01)

(58) Field of Classification Search
CPC ............ H04N 5/23238; H04N 5/23293; G06F 1/1641; G06F 3/04842; G06F 3/04886
See application file for complete search history.

(56) References Cited

U.S. PATENT DOCUMENTS

| | | | |
|---|---|---|---|
| 2001/0005454 A1* | 6/2001 | Nishino | H04M 1/0216 396/287 |
| 2007/0002016 A1 | 1/2007 | Cho et al. | |
| 2007/0108454 A1* | 5/2007 | Yamazaki | G09G 3/30 257/88 |
| 2010/0064536 A1* | 3/2010 | Caskey | G06F 1/1616 33/303 |
| 2011/0050974 A1* | 3/2011 | Nakai | H04N 5/2251 348/333.01 |
| 2012/0144323 A1 | 6/2012 | Sirpal et al. | |
| 2013/0010405 A1 | 1/2013 | Rothkopf et al. | |

(Continued)

FOREIGN PATENT DOCUMENTS

WO 2013058456 A2 4/2013

*Primary Examiner* — Ahmed A Berhan
(74) *Attorney, Agent, or Firm* — Morris & Kamlay LLP

(57) ABSTRACT

An electronic device has an imaging device (such as a still camera or video camera) and is capable of displaying a viewfinder on one side or multiple sides of the device. The device may determine the side or sides on which to display the viewfinder based on factors such as user input, object proximity, grip detection, accelerometer data, and gyroscope data. In one implementation, the device has multiple imaging devices and can select which imaging device to use to capture an image based on the above factors as well.

20 Claims, 13 Drawing Sheets

(56) References Cited

U.S. PATENT DOCUMENTS

| | | |
|---|---|---|
| 2013/0044240 A1 | 2/2013 | Leskela et al. |
| 2013/0169545 A1* | 7/2013 | Eaton .................. H04M 1/0241 345/173 |
| 2014/0098188 A1* | 4/2014 | Kwak et al. .................... 348/38 |
| 2014/0300542 A1* | 10/2014 | Jakubiak ................. G06F 3/017 345/157 |

* cited by examiner

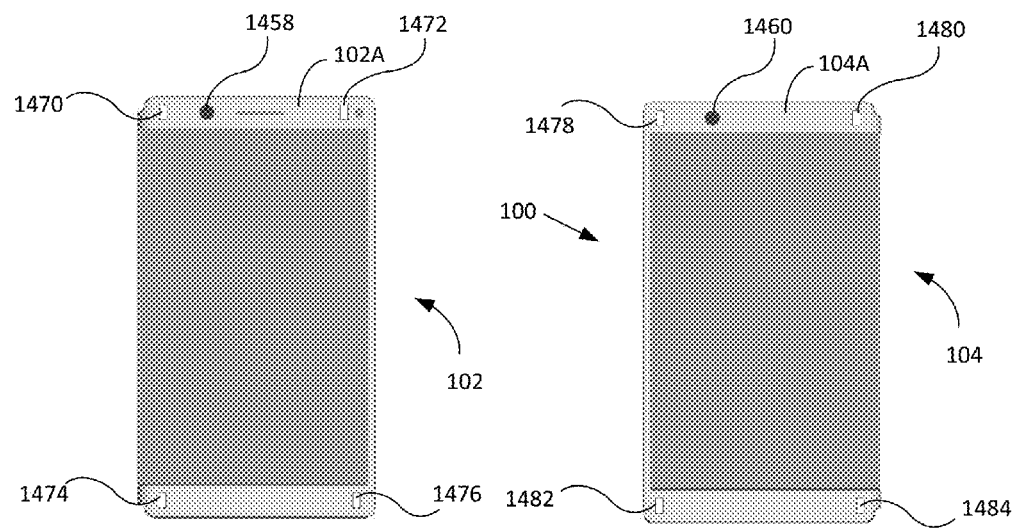
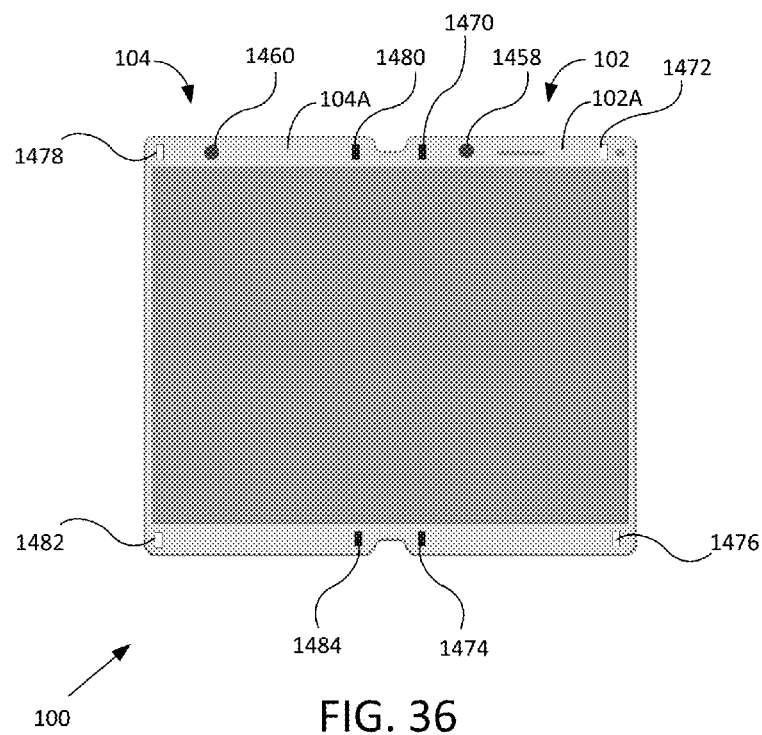

ELECTRONIC DEVICE HAVING MULTIPLE SIDES

CROSS-REFERENCE TO RELATED APPLICATIONS

The present application claims priority to U.S. Provisional Patent Application 61/945,595, filed Feb. 27, 2014, the contents of which are incorporated herein by reference.

TECHNICAL FIELD

The present disclosure relates to multi-sided electronic devices.

BACKGROUND

As the smartphone market matures, manufacturers are increasingly looking for ways to differentiate their products from those of their competitors. One area of distinction is display size. For many consumers, having the largest display possible is a key consideration for selecting a smartphone. There are practical limits to how large of a display a smartphone can have using a traditional form factor, however. At some point, the size of the display will exceed the size of typical stowage compartments (e.g., pants, pockets, or purses). In addition, the overall bulk of the phone will make it difficult to hold with a single hand while making a phone call.

DRAWINGS

While the appended claims set forth the features of the present techniques with particularity, these techniques may be best understood from the following detailed description taken in conjunction with the accompanying drawings of which:

FIGS. 1 and 2 show an electronic device in a first position according to an embodiment;

FIGS. 3, 4, and 5 show the electronic device in a second position according to an embodiment;

FIGS. 6, 7, 8, and 9 show the electronic device in intermediate positions according to various embodiments;

FIGS. 2A. 5A, and 9A show a hinge assembly of the electronic device according to an embodiment;

FIGS. 34 through 36 show different EMR emitter configurations according to various embodiments.

DESCRIPTION

The disclosure is generally directed to an electronic device ("device") having multiple sides. In some embodiments, at least two of the sides are pivotable with respect to one another. The device may have a display that wraps from one side to the other. In some embodiments, the device has multiple display drivers and each display driver is responsible for driving a different pixel region. The device may enable and disable one or more of the drivers based on an angle between the sides of the device. Two or more of the pixel regions may overlap, with one or more drivers being capable of driving the pixels of the overlapping region. The pixels or pixel regions that are enabled may be selected based on the angle between the sides of the device.

In an embodiment, the device has an imaging device (such as a still camera or video camera) and is capable of displaying a viewfinder on one side or multiple sides of the device. The device may determine the side or sides on which to display the viewfinder based on factors such as user input, object proximity, grip detection, accelerometer data, and gyroscope data. In one embodiment, the device has multiple imaging devices and can select which imaging device to use to capture an image based on the above factors as well.

According to an embodiment, the device has multiple gesture sensors (such as infrared sensors) and can interpret gestures based on the movement detected by the gesture sensors. The device may interpret data from each of the gesture sensors as separate gestures, or may interpret the data from two or more of the sensors as one single gesture. The device may select which interpretation to use based on an angle between two or more sides of the device.

Figure 1:
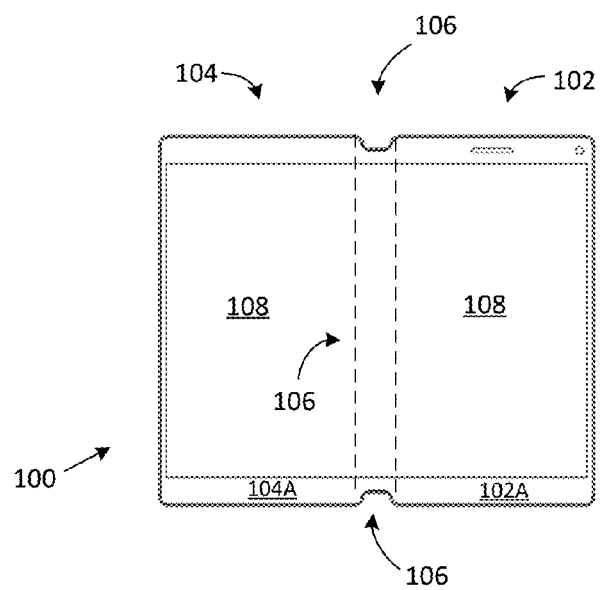
Figure 2:
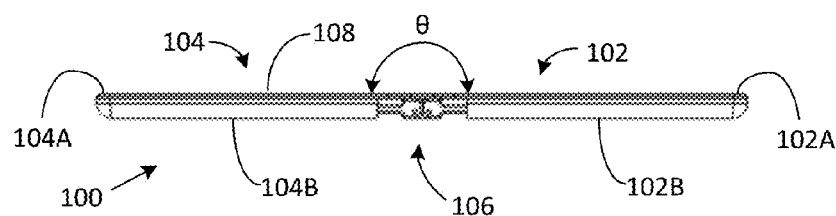

Turning to FIGS. 1 and 2, the device 100 has a first side 102 and a second side 104, which are pivotable with respect to one another at a pivot portion 106. The first side 102 has a first surface 102A and a second surface 102B (shown in FIG. 2). Similarly, the second side 104 has a first surface 104A and a second surface 104B (shown in FIG. 2). The device 100 includes a display 108 that extends across the first surface 102A of the first side 102 and the first surface 104A of the second side 104. The display 108 includes a number of pixels, which may be divided into pixel regions, as will be discussed in more detail below.

Figure 3:
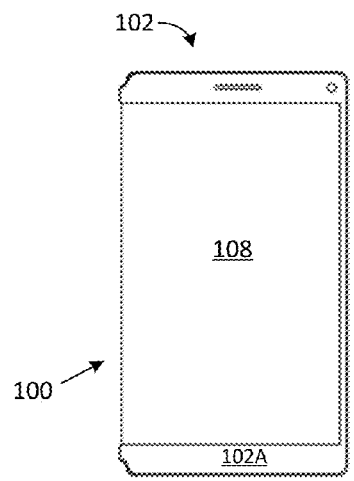
Figure 4:
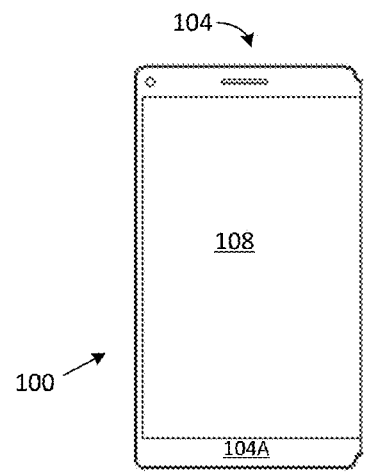
Figure 5:
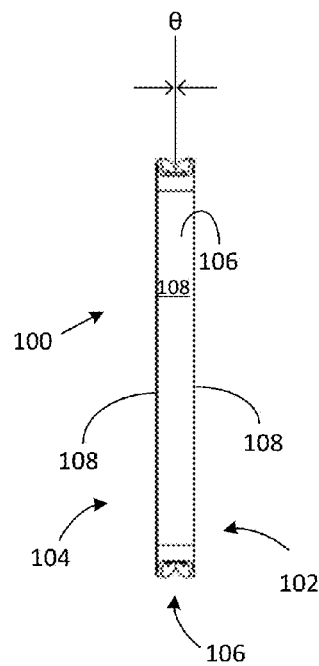

The device 100 can be manipulated into a number of possible positions. FIGS. 1 and 2 depict the device 100 in a position, referred to herein as "the first position," in which the first side 102 and the second side 104 are side-by-side. This first position may also be referred to as "the tablet mode." FIGS. 3, 4, and 5 depict the device 100 in a position, referred to herein as "the second position," in which the first side 102 and the second side 104 are back-to-back. If the device 100 is implemented as a mobile phone, this second position may be referred to as "the phone mode." Turning to FIGS. 6, 7, 8, and 9, the device 100 is depicted in different intermediate positions. The intermediate position shown in FIGS. 6 and 8 may be referred to as "the desktop mode," while that shown in FIGS. 7 and 9 may be referred to as "the dual-user mode." In each of the positions of the device 100, the first side 102 and the second side 104 form an angle θ, which is shown in FIGS. 2, 5, 8, and 9. Examples of angle ranges for θ for the first, second, and intermediate positions will be discussed below. Possible implementations of the device 100 include a smartphone and a tablet computer, with or without communication capability.

Figure 2A:
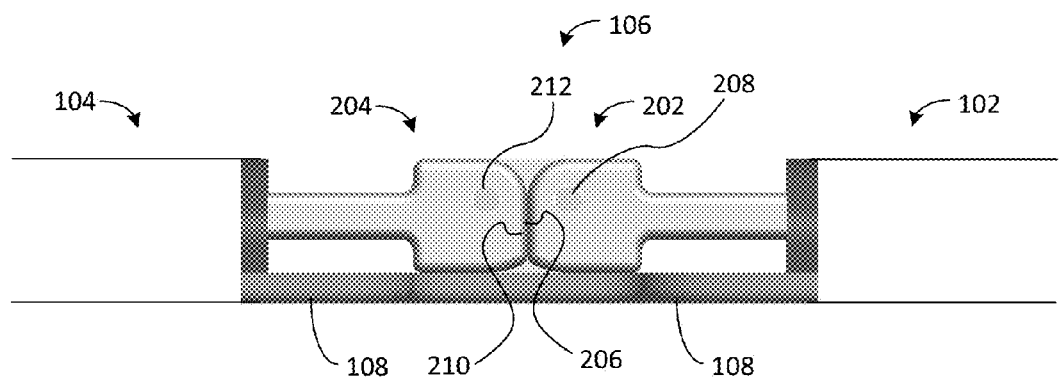
Figure 5A:
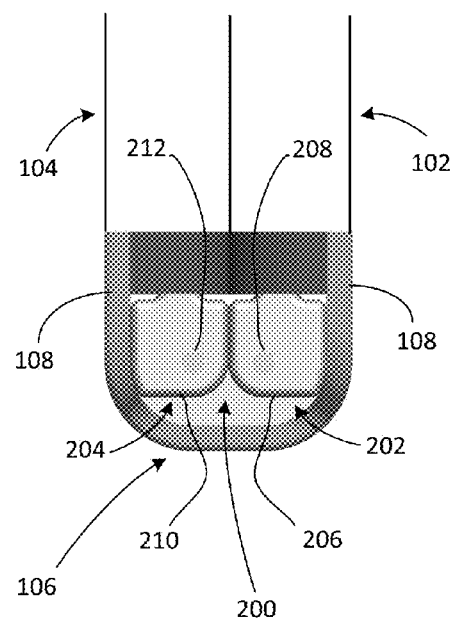
Figure 9:
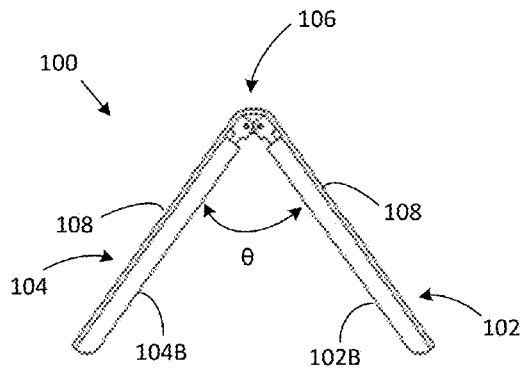
Figure 9A:
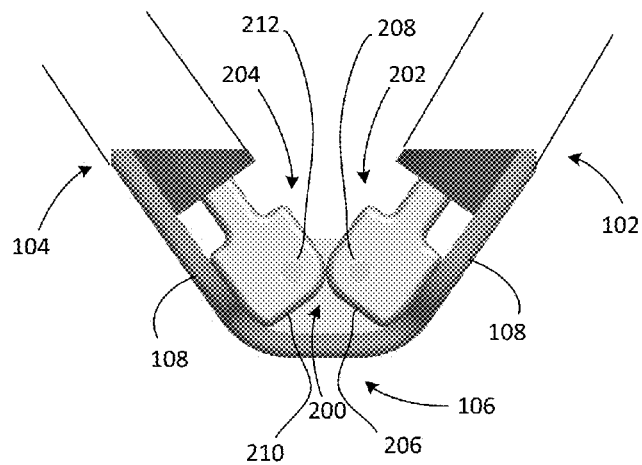

Turning to FIGS. 2A, 5A, and 9A, the device 100 includes a hinge assembly 200, which has a first hinge 202 slideably coupled to the first side 102 and a second hinge 204 slideably coupled to the second side 104. The hinge assembly 200 defines a contour of the display 108 when the device 100 in the phone mode or in the desktop mode. The first hinge 202 has a flip stop 206 that is coupled to a hinge barrel (which runs along the short axis of the device 100) by a pin 208. The second hinge 204 has a flip stop 210 that is coupled to another hinge barrel (which runs along the short axis of the device 100) by a pin 212. The first hinge 202 and the first side 102 pivot about the pin 208, and the second hinge 204 and the second side 104 pivot about the pin 212. FIG. 2A shows the configuration of the hinge assembly 200 when the device 100 is in the first position, FIG. 5A shows the configuration of the hinge assembly 200 when the device 100 is in the second position, and FIG. 9A shows the configuration of the hinge assembly 200 when the device 100 is in an intermediate position.

In an embodiment, the locations of pixels of the device 100 that are enabled on the display 108 vary according to the mode of the device 100. This can be seen in FIGS. 10, 11, 12, and 13, in which the vertical-lined regions represent pixels that are enabled, while the cross-hatched regions represent pixels that are disabled. This convention will be used for the rest of this disclosure unless otherwise indicated. As used herein, a pixel being "disabled" does not necessarily mean that the pixel does not receive power, but may mean that the pixel receives power, but is set to black.

Figure 10:
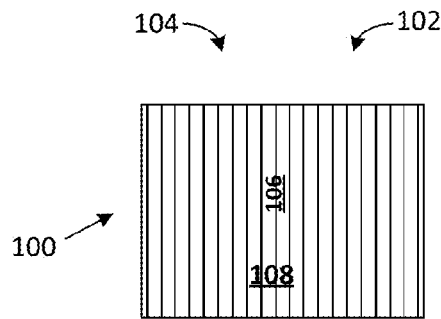
FIGS. 10 through 13 show various pixel configurations for the electronic device according to various embodiments.
Figure 11:
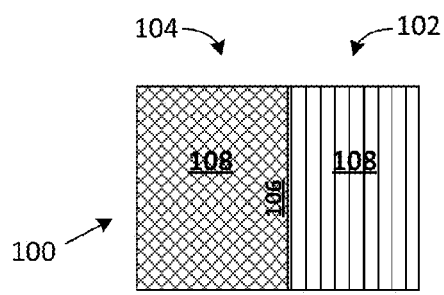
Figure 12:
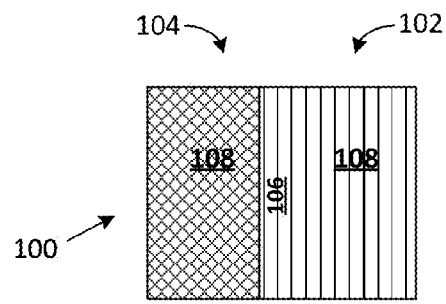
Figure 13:
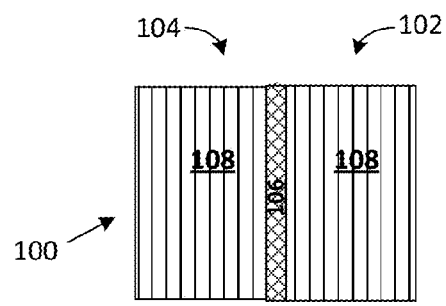

FIGS. 10 through 13 show the status of the pixels of the device 100 in the mode indicated by the accompanying description. In particular, FIG. 10 shows the status of the pixels when the device 100 is in the tablet mode, FIG. 11 shows the status of the pixels when the device 100 is in the phone mode, FIG. 12 shows the status of the pixels when the device 100 is in the desktop mode, and FIG. 13 shows the status of the pixels when the device 100 is in the dual-user mode.

Figure 14:
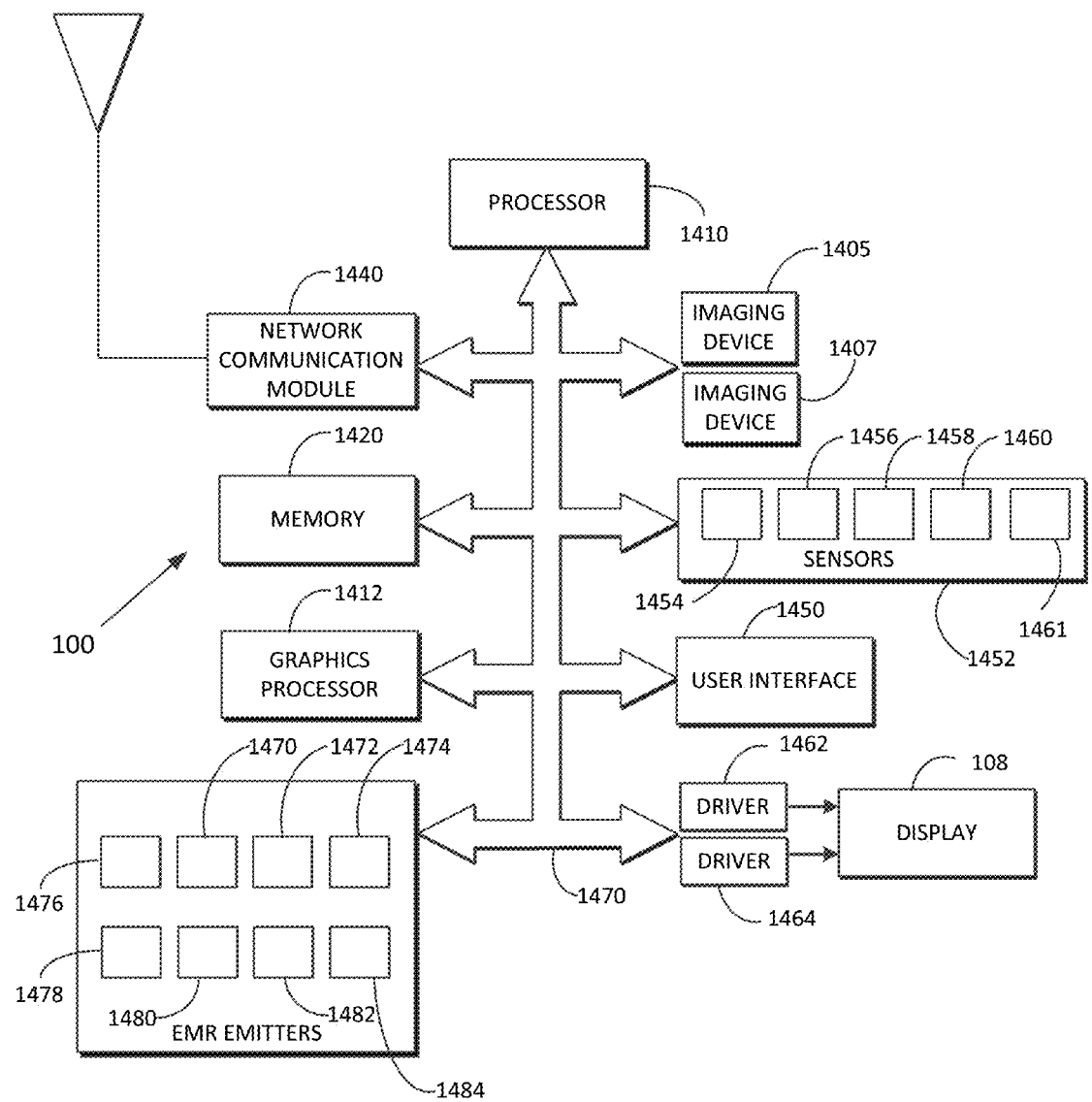
FIG. 14 shows an embodiment of the electronic device.

Turning to FIG. 14, the electronic device 100 according to an embodiment includes a processor 1410, a memory 1420 (which can be implemented as volatile memory or non-volatile memory), a network communication module 1440 (e.g., a communication chip such as a WiFi chip, or a communication chipset, such as baseband chipset), a first imaging device 1405, a second imaging device 1407, the display 108, a graphics processor 1412, and a user interface 1450. Possible implementations of the processor 1410 include a microprocessor and a controller.

The processor 1410 retrieves instructions and data from the memory 1420 and, using the instructions and data, carries out the methods described herein. The processor 1410 provides outgoing data to, or receives incoming data from the network communication module 1440.

The device 100 further includes sensors 1452. Among the sensors 1452 are a motion sensor 1454 (e.g., an accelerometer or gyroscope), a flip angle sensor 1456, a first gesture sensor 1458, a second gesture sensor 1460, and a proximity sensor 1461. The motion sensor 1454 senses one or more of the motion and orientation of the device 100, generates data regarding the motion and orientation (whichever is sensed), and provides the data to the processor 1410. The flip angle sensor 1456 senses the angle between the first side 102 and the second side 104 of the device 100, generates data regarding the angle, and provides the data to the processor 1410. The processor 1410 can determine the position (e.g., first position, second position, or intermediate position) or mode (e.g., tablet mode, phone mode, desktop mode, or dual-user mode) based one or more of motion data from the motion sensor 1454, orientation data from the motion sensor 1454, and angle data from the flip angle sensor 1456. The processor 1410 may use various criteria for mapping the angle data to the various positions and modes, such as whether the angle is above, is below, or meets a particular threshold value (e.g., first threshold value, second threshold value, etc.), or whether the angle falls into a particular range (e.g., first range, second range, etc.) The processor 1410 may use multiple threshold values or a single threshold value. The angle ranges may be contiguous with one another (e.g., a first range may be contiguous with a second range) or not.

The proximity sensor 1461 senses proximity of objects, generates data regarding the proximity, and provides the data to the processor 1410. The processor 1410 may the interpret the data to determine whether, for example, a person's head is close by or whether the device 100 is being gripped. The first gesture sensor 1458 and the second gesture sensor 1460 sense movement of objects that are outside of the device 100. The gesture sensors 1458 and 1460 generate data regarding the movement and provide the data to the processor 1410. The first gesture sensor 1458 and the second gesture sensor 1460 may each be implemented as an Electromagnetic Radiation ("EMR") sensor, such as an infrared ("IR") sensor.

In some embodiments, the device 100 includes a first display driver 1462 and a second display driver 1464, either or both of which may drive the display 108 in a manner that will be discussed below in more detail. The processor 1410 or the graphics processor 1412 sends video frames to one or both of the first display driver 1462 and the second display driver 1464, which in turn display images on the display 108. In some embodiments, the display drivers 1462 and 1464 include memory in which to buffer the video frames. The display drivers 1462 and 1464 may be implemented as a single hardware component or as separate hardware components.

According to some embodiments, the device 100 includes EMR emitters 1470 through 1484. Each of the EMR emitters may be implemented as IR Light Emitting Diodes ("LEDs"). In such embodiments, the first and second gesture sensors 1458 and 1460 detect EMR emitted from the EMR emitters and reflected off of an object, such as a person's hand.

Each of the elements of FIG. 14 is communicatively linked to one or more other elements via one or more data pathways 1470. Possible implementations of the data pathways 1470 include wires and conductive pathways on a microchip.

Figure 15:
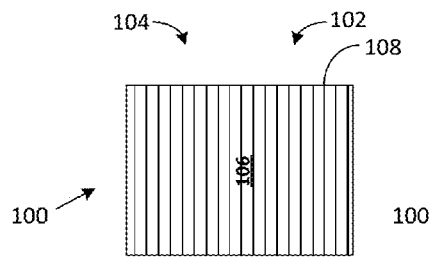
FIGS. 15 through 23 show various pixel configurations for the electronic device according to various embodiments.
Figure 16:
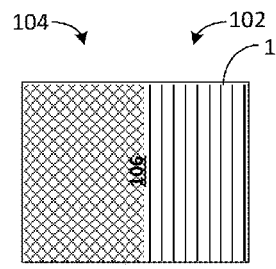
Figure 17:
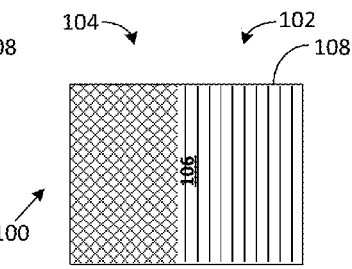

Turning to FIGS. 15, 16, and 17, in an embodiment, the device 100 enables pixels and disables pixels of the display 108 such that the number and location of pixels that are enabled or disabled is based on an angle between the first side 102 and the second side 104.

Referring to FIG. 15, when the device 100 is in the first position, the first side 102 and the second side 104 form an angle θ (FIG. 2) that falls in a range from about 165 degrees to about 180 degrees. Based on θ falling within this range, the processor 1410 enables all of the pixels of the device 100 (on the display 108).

Referring to FIG. 16, when the device 100 is in the second position, the first side 102 and the second side 104 form an angle θ (FIG. 5) that falls in a range from about 0 degrees to about 15 degrees. Based on θ falling within this range, the processor 1410 enables fewer than half of the pixels of the device 100 and disables the remaining pixels.

Finally, referring to FIG. 17, when the device 100 is in an intermediate position, such as the desktop mode, the first side 102 and the second side 104 form an angle θ (FIG. 8) that falls in a range from about 65 degrees to about 90 degrees. Based on θ falling within this range and, possibly, on the motion sensor 1454 indicating the orientation of the device 100 to be the desktop mode, the processor 1410 enables more than half of the pixels of the device 100, and disables the remaining pixels.

Figure 18:
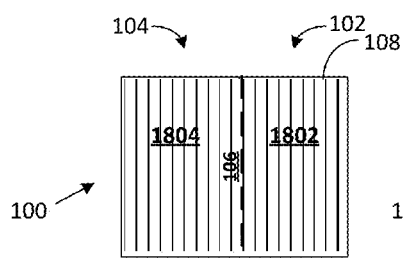
Figure 19:
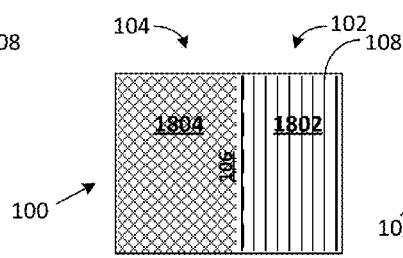
Figure 20:
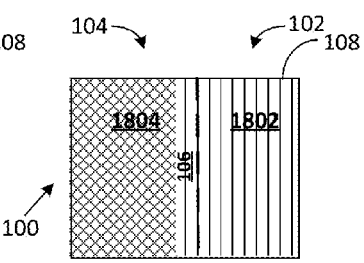

Turning to FIGS. 18, 19, and 20, in an embodiment, the device 100 has a first pixel region 1802 and a second pixel region 1804. The first pixel region is at least partly on the first side 102, while the second pixel region 1804 is at least partly on the second side 104. The first display driver 1462 is responsible for driving the first pixel region 1802, and the second display driver 1464 is responsible for driving the second pixel region 1804. The first pixel region 1802 and the second pixel region 1804 of FIGS. 18, 19, and 20 are non-overlapping. It will be assumed for the embodiments of this disclosure that θ may have the ranges described above for the first, second, and intermediate positions. In other embodiments, θ may have different ranges or thresholds. The pixel regions in the embodiment of FIGS. 18, 19, and 20 are non-overlapping, and the boundary between the first pixel region 1802 and the second pixel region 1804 is indicated by the dashed line.

In FIG. 18, the device 100 is in the first position and, consequently, the processor 1410 enables the first display driver 1462 and the second display driver 1464. The first display driver 1462 has enabled all of the pixels in the first pixel region 1802 and the second display driver 1464 has enabled all of the pixels in the second pixel region 1804.

In FIG. 19, the device 100 is in the second position and, consequently, the processor 1410 enables the first display driver 1462 and disables the second display driver 1464. The first display driver 1462 enables all of the pixels in the first pixel region 1802. In some embodiments, the processor 1410 enables both the first display driver 1462 and the second display driver 1464 when the device 100 is in the second position, but the first display driver 1462 drives the first pixel region 1802 at a first frame rate, and the second display driver 1464 drives the second pixel region 1804 at a second, slower frame rate.

Figure 6:
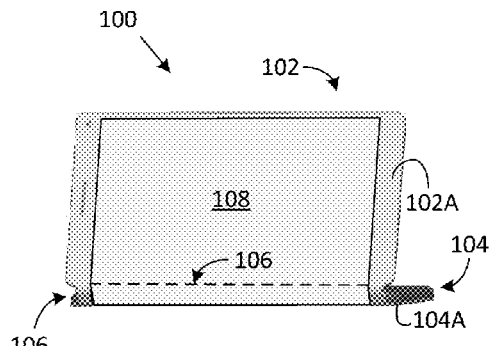
Figure 8:
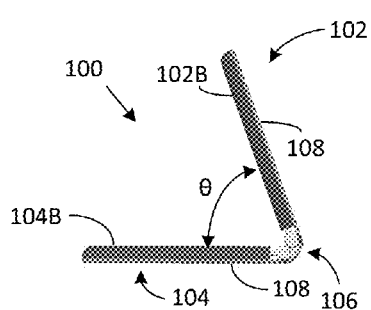

In FIG. 20, the device 100 is an intermediate position (the desktop mode of FIGS. 6 and 8). Consequently, the processor 1410 enables both the first display driver 1462 and the second display driver 1464. The first display driver 1462 enables all of the pixels of the first pixel region 1802, while the second display driver 1804 enables some pixels of the second pixel region 1804 (e.g., those of the pivot portion 106) and disables the rest of the pixels of the second pixel region 1804.

Figure 21:
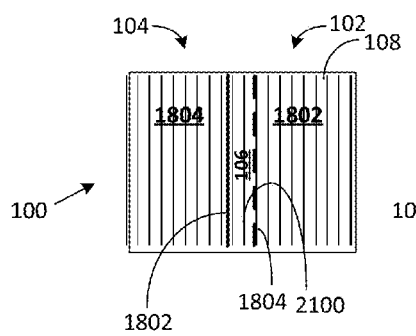
Figure 22:
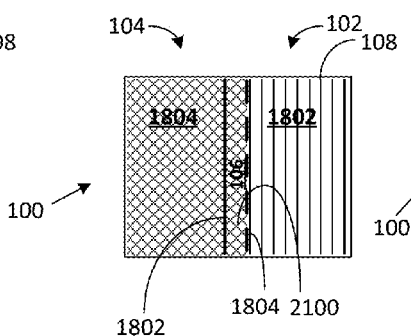
Figure 23:
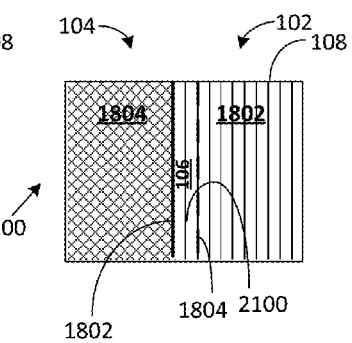

Turning to FIGS. 21, 22, and 23, in an embodiment, the first display driver 1462 and the second display driver 1464 are each responsible for driving a different pixel region of the device 100, but the pixel regions partly overlap in an overlapping pixel region 2100. In this embodiment, the first display driver 1462 drives the first pixel region 1802 and the overlapping pixel region 2100. The second display driver 1464 drives the second pixel region 1804, which now includes the overlapping pixel region 2100. Thus, in this embodiment, both drivers are capable of driving the overlapping pixel region 2100. The boundary of the first pixel region 1802 is indicated by the solid line, while the boundary of the second pixel region 1804 is indicated by the dashed line. The overlapping region 2100 is the region between the solid line and the dashed line. Although the overlapping region 2100 and the pivot portion 106 are shown as being coextensive, this need not be the case.

In FIG. 21, the processor 1410 determines that the device 100 is in the first position and, consequently, enables both the first display driver 1462 and the second display driver 1464, but only one of the drivers—the first display driver 1462 in this example—drives the overlapping region 2100. The first display driver 1462 enables all of the pixels of the first pixel region 1802 and all of the pixels of the overlapping region 2100. The second display driver 1464 enables all of the pixels of the second pixel region 1804.

In FIG. 22, the processor 1410 determines that the device 100 is in the second position and, consequently, enables the first display driver 1462 and disables the second display driver 1464. The first display driver 1462 enables the pixels of the first region 1802 but disables the pixels of the overlapping region 2100. In some embodiments, when the device 100 is in the second position, the processor 1410 enables both the first display driver 1462 and the second display driver 1464, but the first display driver 1462 drives the first pixel region 1802 at a first frame rate, and the second display driver 1464 drives the second pixel region 1804 at a second, slower frame rate.

In FIG. 23, the processor 1410 determines that the device 100 is in an intermediate position (the desktop mode of FIGS. 6 and 8) and, consequently, enables the first display driver 1462 and disables the second display driver 1464. The first display driver 1462 enables the pixels of the first pixel region 1802 and the overlapping region 2100.

Figures 24, 25:
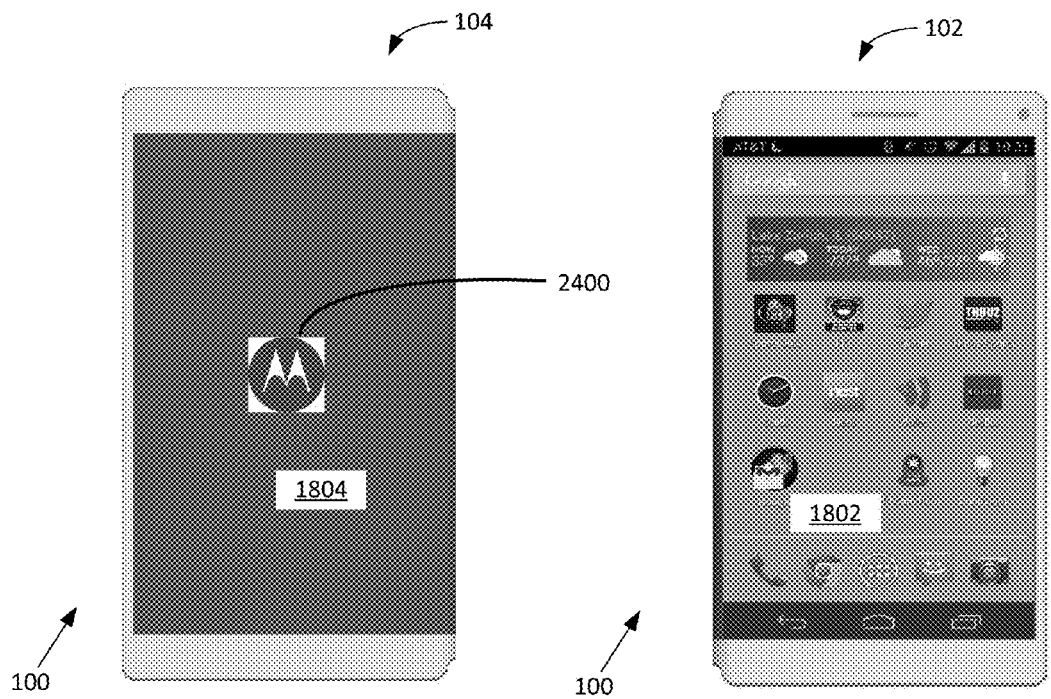
FIGS. 24 through 26 show an active and passive display according to an embodiment.
Figure 26:
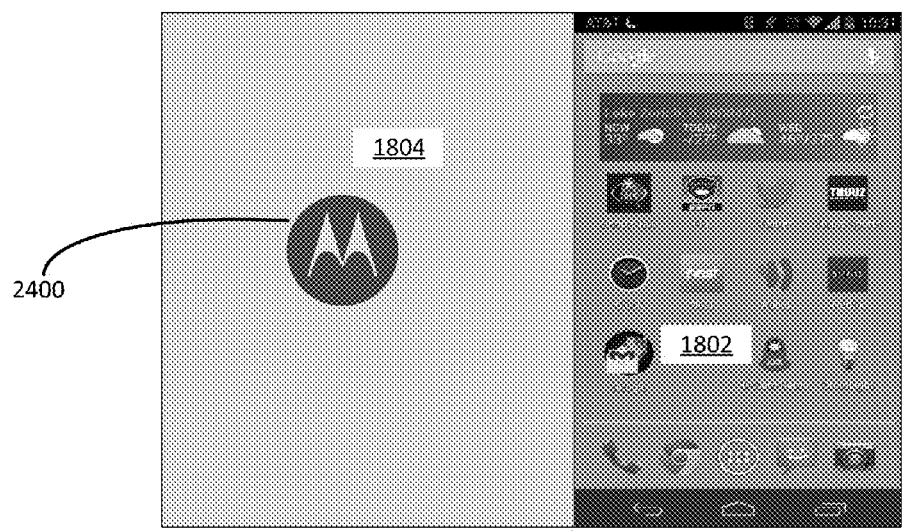

As previously noted, the first display driver 1462 and the second display driver 1464 of the device 100 may drive different pixel regions at different frame rates. Turning to FIGS. 24, 25, and 26, in an embodiment, when the device 100 is in the second position, the second display driver 1464 drives the second pixel region 1804 at a slower frame rate than the first display driver 1462 drives the first pixel region 1802. One use case for this configuration is where the first pixel region 1802 is implemented as an active smartphone user interface, as shown in FIGS. 25 and 26, and the second pixel region 1804 is implemented as a passive, static display, possibly displaying a logo 2400, as shown in FIGS. 24 and 26. Instead of the logo 2400, the second pixel region 1804 may display cobranding indicia, colored wallpaper, or the like. In this case, the first display driver 1462 is displaying the active user interface on all of the pixels of the first pixel region 1802, and the second display driver 1464 is displaying a static, stored image from its memory in the display region 1804. The second display driver 1464 may refrain from refreshing the pixels of the second pixel region 1804, or may simply refresh the pixels of the second pixel region 1804 at a slower frame rate than the first display driver 1462 refreshes the pixels of the first pixel region 1802. In short, one pixel region of the display may have actively controlled pixels while the other region of the display may have a static, stored image that is not refreshed, or refreshed at a slower rate.

According to an embodiment, when the device 100 is in the "phone mode," it can use one of the imaging devices 1405 and 1407 to capture images. The user may be allowed to select, via a user interface toggle, the pixel region (e.g., that of the first side 102 or that of the second side 104) of the display 108 on which to show the viewfinder. Alternatively, the processor 1410 may intelligently select the pixel region for the viewfinder based on object proximity (e.g., a person's face or head, as detected by one of the imaging devices 1405 and 1407), grip detection (which may be implemented as capacitive sensors on the device 100), or readings of the motion sensor 1454. If the viewfinder is initiated and the processor 1410 detects a "tight rotation" of the device via the motion sensor 1454 (indicating that the user flipped the device around), the processor 1410 may switch the viewfinder to another pixel region.

Figure 27:
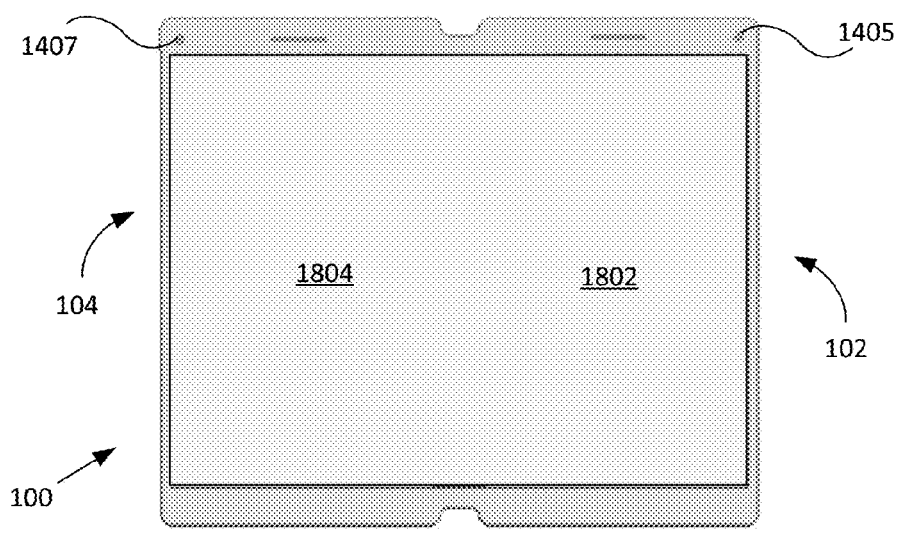
FIGS. 27 through 32 show different viewfinder configurations according to various embodiments.
Figure 28:
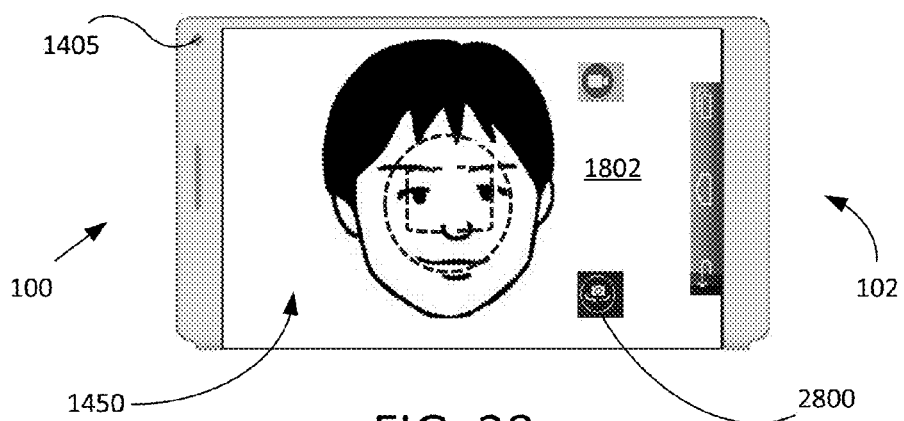
Figure 29:
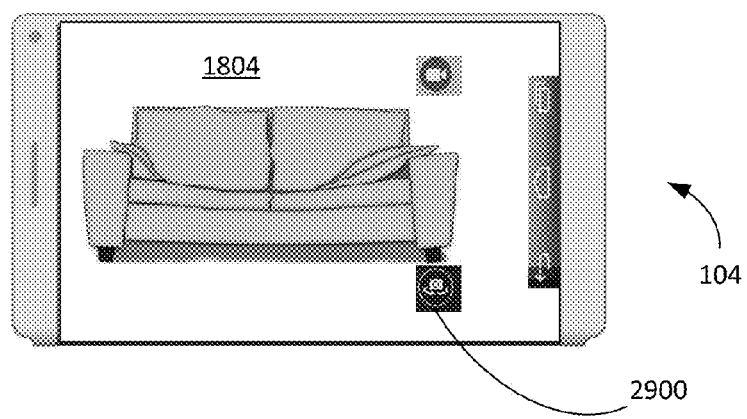

Turning to FIGS. 27, 28, and 29, according to an embodiment, the processor 1410 can select either or both the first imaging device 1405 and the second imaging device 1407 as the active imaging device, and do so based on the angle θ (FIGS. 2, 5, 8, and 9) between the first side 102 and the second side 104 of the device 100. Furthermore, the processor 1410 can display a viewfinder for one of the imaging devices 1405 and 1407 on either the first pixel region 1802 (on the first side 102) or the second pixel region 1804 (on the second side 104) of the device 100, and do so based on the angle θ. The processor 1410 can also display a viewfinder for one of the imaging devices 1405 and 1407 in both the first pixel region 1802 and the second pixel region 1804.

If the processor 1410 selects the first imaging device 1405, then it may display the viewfinder in the first pixel region 1802 for a front-facing picture (FIG. 28) or may display the viewfinder in the second pixel region 1804 for a rear-facing picture (FIG. 29, with the first imaging device 1405 hidden from view). As previously noted, the processor 1410 may select the pixel region for the single imaging device (the first imaging device 1405 in this example) based on user input (e.g., the on-screen buttons 2800 and 2900), object proximity, grip detection, or readings of the motion sensor 1454.

In short, the device 100 is able to use the same imaging device for both self-portrait and scenery image captures, and the same display device (the display 108) for the viewfinder in both applications. The device 100 accomplishes this by changing the pixel region.

Figure 30:
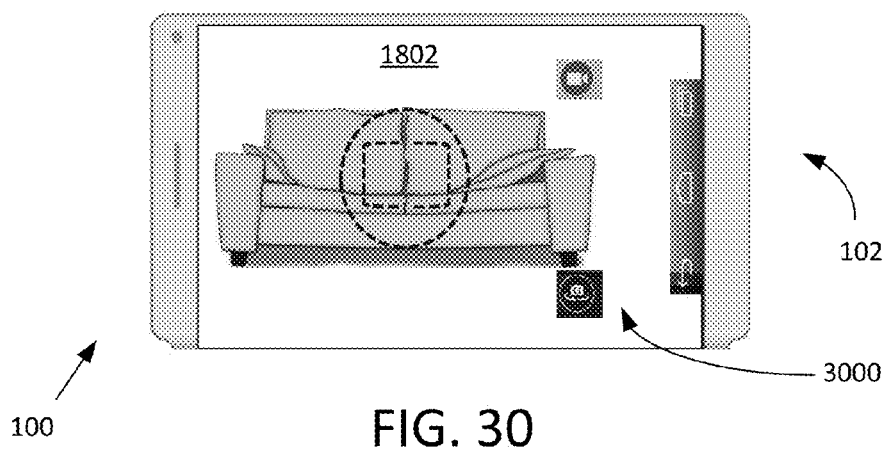
Figure 31:
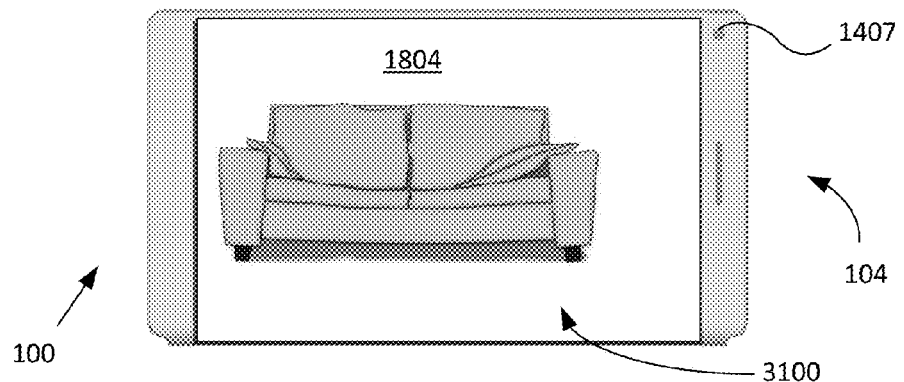
Figure 32:
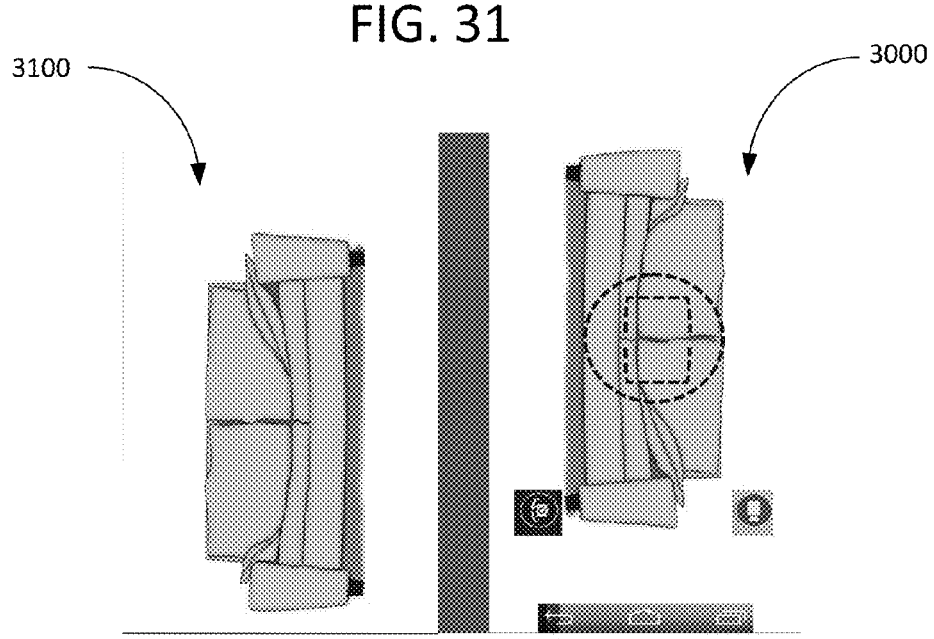

According to an embodiment, when the device 100 is in phone more, the device 100 may use a single imaging device (either the imaging device 1405 or the imaging device 1407) and display multiple viewfinders. Turning to FIGS. 30 and 31, if the device 100 is in the second position, the processor 1410 may select one of the imaging devices 1405 and 1407, but display two instances of the viewfinder—a first instance 3000 of the viewfinder in the first pixel region 1802 (with an imaging control or camera user interface), and a second instance 3100 of the viewfinder in the second pixel region 1804. Both the person taking the photo and the subject can see how the subject will appear in the photo. In this scenario, the orientation of each instance of the viewfinder will be rotated with respect to the other—e.g., 180 degrees off from one another, as shown in FIG. 32.

Referring back to FIG. 27, in an embodiment, if the device 100 is in the first position, the processor 1410 may select both the first imaging device 1405 and the second imaging device 1407, with the viewfinder extending across both the first pixel region 1802 and the second pixel region 1804. Having two imaging devices active allows for stereoscopic or 3D pictures to be taken. Alternatively, the processor 100 may select only one of the imaging devices for standard 2D pictures.

In an embodiment, the device 100 can use both of the imaging devices 1405 and 1407 to initiate a "panoramic sweep." To execute the sweep, the user slowly opens the device 100 (from the second position) or closes the device 100 (from the first position) and the processor 1410 uses the angle data and image data from both imaging devices 1405 and 1407 to stitch together a wide panoramic sweep of the landscape.

Figure 33:
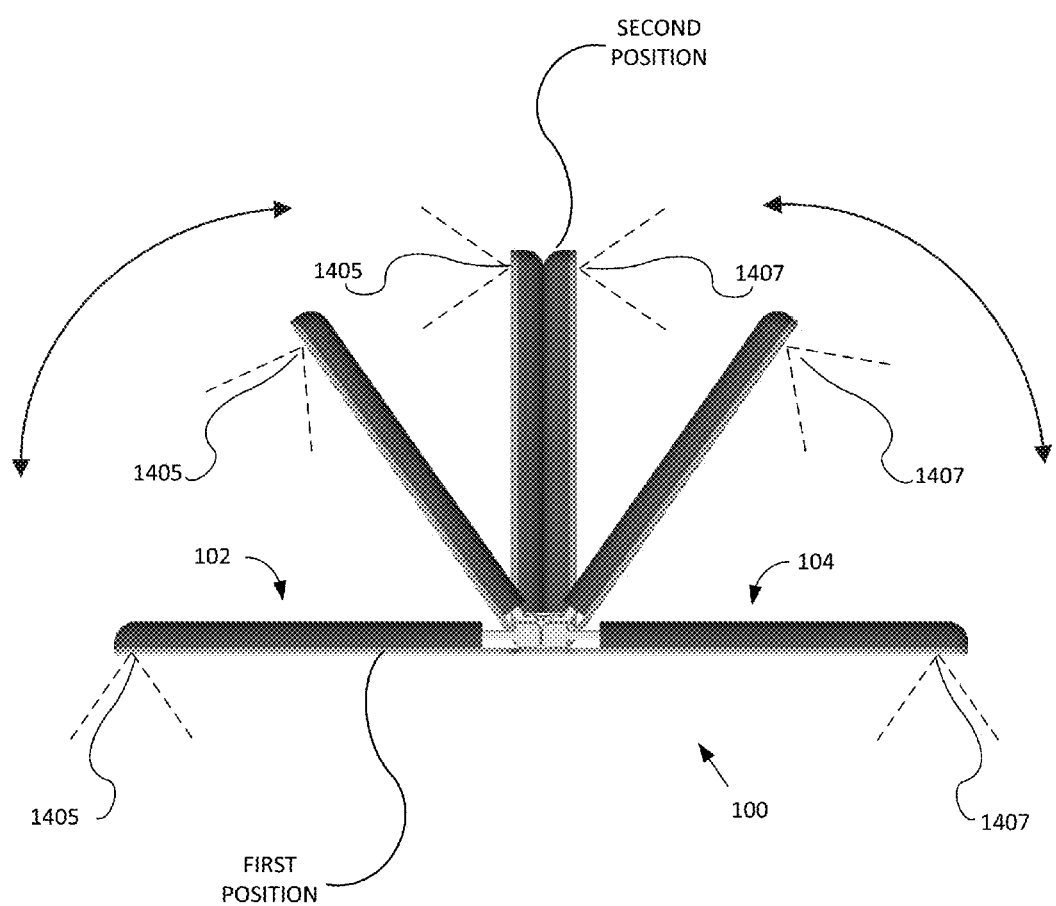
FIG. 33 shows a panoramic operation according to an embodiment.

Referring to FIG. 33, the device 100 is capable of taking panoramic images as follows, in an embodiment. The device 100 starts out in the second position. The first side 102 and the second side 104 are pivoted with respect to one another toward the first position. As the two sides are being pivoted, the first imaging device 1405 and the second imaging device 1407 independently capture image data. The processor 1410 converts the image data from the first imaging device 1405 into a first panoramic image, and converts the image data from the second imaging device 1407 into a second panoramic image. As the fields of view of the first imaging device 1405 and the second imaging device 1407 begin to overlap, the processor combines (stitches together) the first panoramic image and the second panoramic image to create a third panoramic image. The center portion of the stitched image may also include 3D elements where data from both imaging devices of the same scenery is available to be combined. In another implementation, the same process occurs, except in reverse, as the device 100 starts out in the first position and the two sides 102 and 104 are pivoted toward the second position. In one embodiment, the hinges of the hinge assembly 200 (FIGS. 2A, 5A, and 9A) are geared together such that the angle between the first imaging device 1405 and a plane orthogonal to the point of pivot is always equal and opposite to the angle between the second imaging device 1407 and the plane.

Turning to FIGS. 34, 35, and 36, in an embodiment, the device 100 includes the first gesture sensor 1458 on the first surface 102A of the first side 102 and the second gesture sensor 1460 on the first surface 104A of the second side 104. The processor 1410 monitors movement data from the first gesture sensor 1458 and movement data from the second gesture sensor 1460. If the device 100 is in a first position, such as shown in FIG. 36, the processor 1410 may carry out a single gesture recognition procedure using the motion data of both gesture sensors or may disable one of the gesture sensors and use only a single gesture sensor. In other words, the processor 1410 interprets motion over the sensors as a single gesture when the device 100 is in the first position.

Figure 7:
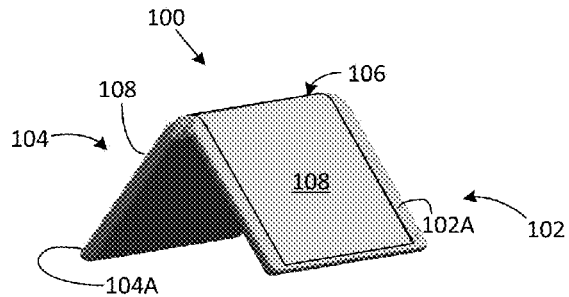
Figure 37:
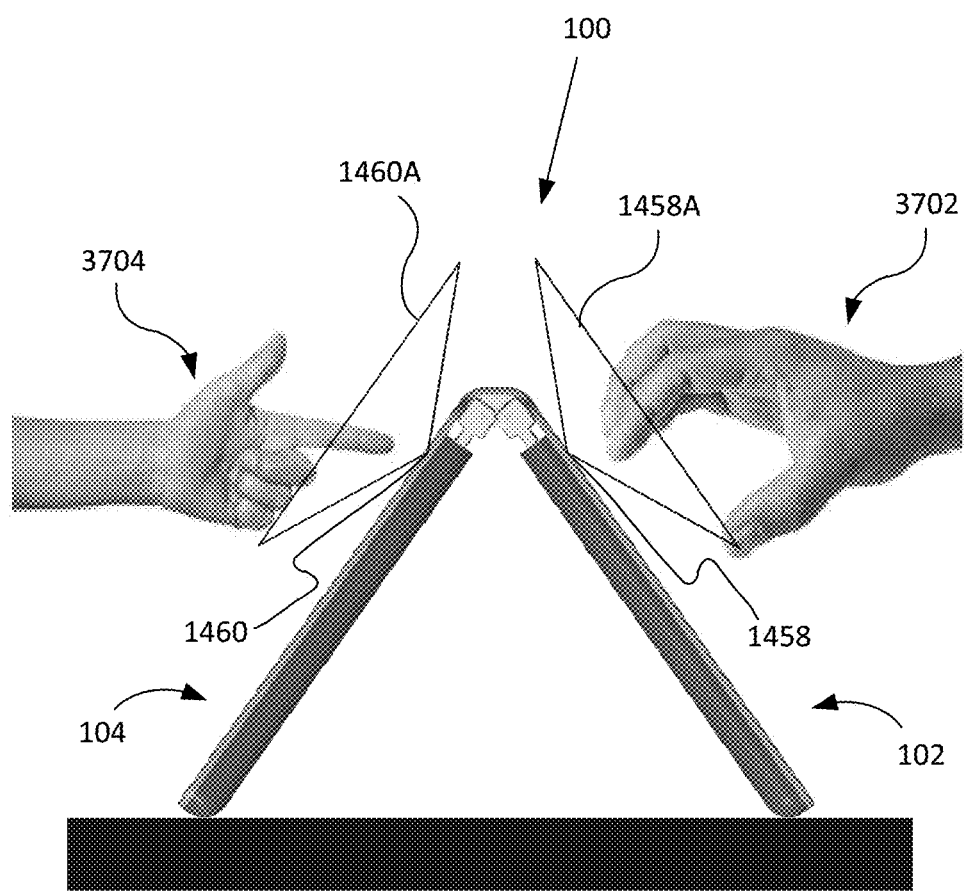
FIGS. 37 and 38 show a dual-user mode according to an embodiment.

If the device 100 is in the second position, such as shown in FIGS. 34 and 35, or in an intermediate position, such as that described in conjunction with FIG. 7, then the processor 1410 may carry out a first gesture recognition procedure based on the movement data from the first gesture sensor 1458, and carry out a second gesture recognition procedure based on the movement data from the second gesture sensor 1460. In other words, the processor 1410 can interpret movement data from the two gesture sensors as two separate gestures. The movement data and gestures may overlap in time such that the two gesture recognition procedures occur nearly simultaneously. FIG. 37 illustrates a use case for interpreting the movement as two separate gestures. The first gesture sensor 1458 has a field of view 1458A, and the second gesture sensor 1460 has a field of view 1460A. In FIG. 37, the device 100 is in a dual-user mode (as shown in FIG. 7 and FIG. 9). The processor 1410 determines that the device 100 is in dual-user mode based on data from the flip angle sensor 1456 and, potentially, based on data from the motion sensor 1454. Based on this determination, the processor 1410 interprets data from the first gesture sensor 1458 as one gesture and data from the second gesture sensor 1460 as another gesture. The data from the two sensors may partially overlap in time. This embodiment allows for scenarios like two-player input on games or independent control of two separate video playback streams—one on each side of the device 100.

Referring back to FIGS. 34, 35, and 36, in one embodiment, the first gesture sensor 1458 and the second gesture sensor 1460 are EMR sensors, and the device 100 further includes the EMR emitters 1470 through 1484, with EMR emitters 1470, 1472, 1474, and 1476 located on the first surface 102A of the first side 102, and EMR emitters 1478, 1480, 1482, and 1484 located on the first surface 104A of the second side 104. The first and second gesture sensors 1458 and 1460 detect motion by using EMR emitted from the EMR emitters and reflected off of moving objects, such as a person's hand.

According to an embodiment, the processor 1410 activates or deactivates one or more of the EMR emitters based on the angle θ between the first side 102 and the second side 104 of the device 100. For example, if the device 100 is in the second position, shown in FIGS. 34 and 35, the processor 1410 may enable the all of the EMR emitter. If, on the other hand, the device 100 is in the first position, the processor 1410 may enable what are now the outer EMR emitters 1478, 1482, 1472, and 1476, and disable what are now the inner EMR emitters 1480, 1470, 1484, and 1474.

Figure 38:
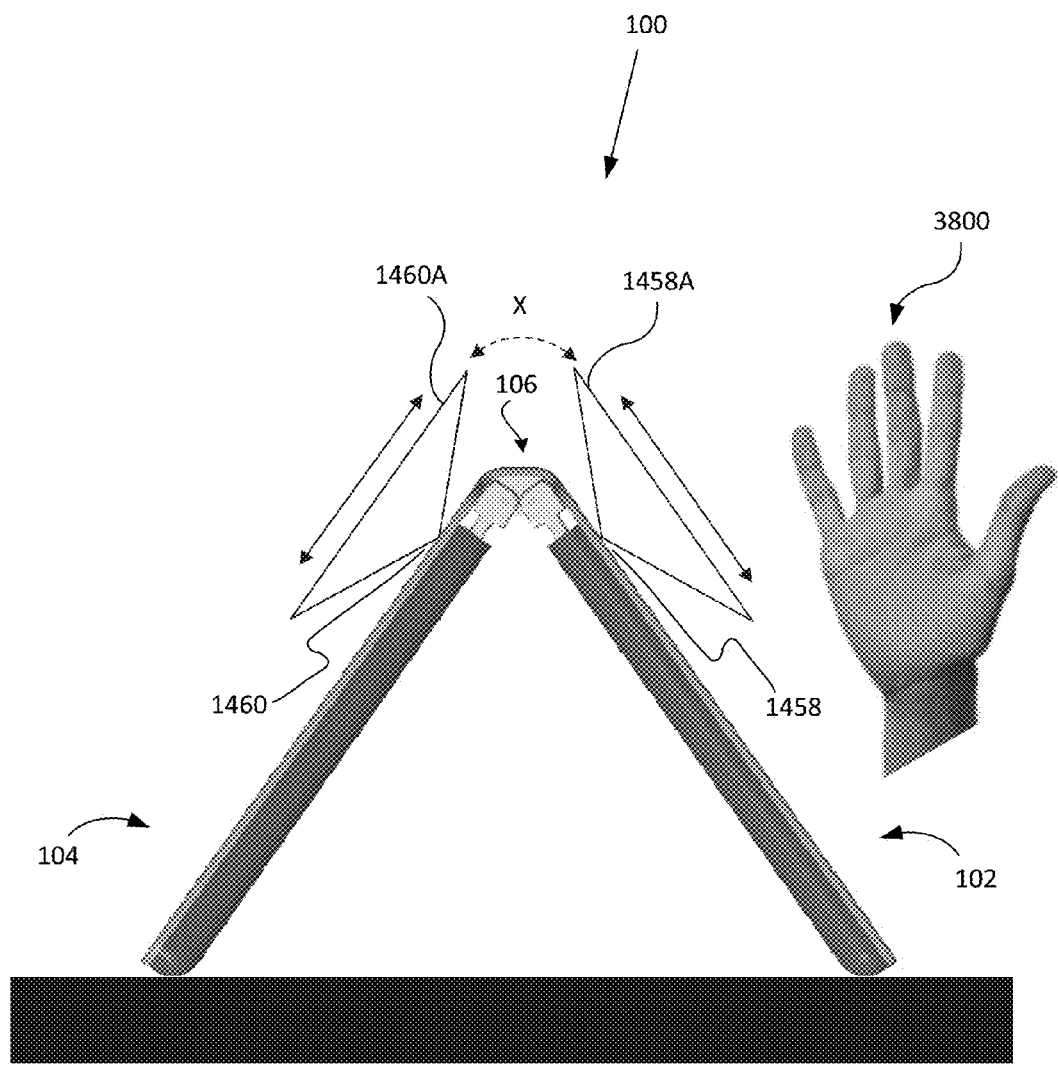

Turning to FIG. 38, according to an embodiment, the processor 1410 determines whether to interpret motion data from the two sensors as a single gesture or as two separate gestures based on an amount of time X, which is the difference between the first gesture sensor 1458 detecting or ceasing to detect movement and the second gesture sensor 1460 detecting or ceasing to detect movement. If the amount of time X meets a first criterion (e.g., a threshold or range), the processor 1410 performs gesture recognition on the motion data from the two gesture sensors as if there is a single gesture. An example of single gesture would be if a user's hand 3800 sweeps up the first side 102 of the device 100, across the field of view 1458A of the first gesture sensor 1458, over the pivot portion 106, and down past the field of view 1460A of the second gesture sensor 1460. If, on the other hand, the amount of time X meets a second criterion, then the processor 1410 will interpret the motion data from the two sensors separately as two gestures. An example of two gestures can be seen in FIG. 37, where there are two users 3702 and 3704 playing a game on the device where user 3702 is facing the first side 102 of the device 100, user 3704 is facing the second side 104 of the device 100, and each user has a separate gesture-based control. The determination to perform gesture recognition on the motion data from the two gesture sensors as if there is a single gesture or as two separate gestures may be based on other factors than the time delay X. For instance, running a certain application on the device may cause the processor to perform gesture recognition a certain way. The device may also use imaging devices 1405 and 1407 to check for the presence of multiple users on different sides of the device in a dual user mode such as that of FIG. 37. The presence of multiple users may dictate the method the processor employs to perform the gesture recognition.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. An electronic device comprising:
a first side having a first pixel region;
a second side having a second pixel region, wherein the first side and the second side are pivotable with respect to one another;
a first imaging device disposed on either the first side or the second side;
a second imaging device disposed on either the first side or the second side; and
a processor configured to select:
the first pixel region or the second pixel region for displaying the viewfinder for the imaging device, a selection of a pixel region based on at least one of a grip detection, accelerometer data, gyroscope data, or a proximity between an object and the electronic device; and
the first imaging device or the second imaging device to capture an image, a selection of an imaging device based on at least one of the grip detection, the accelerometer data, the gyroscope data, or the proximity between the object and the electronic device.

2. The electronic device of claim 1, wherein the processor is further configured to select the first pixel region or the second pixel region and the first imaging device or the second imaging device based on a user input.

3. The electronic device of claim 1, wherein at least one of the first pixel region or the second pixel region is further configurable to act as an interface.

4. An electronic device comprising:
a first side having a first pixel region;
a second side having a second pixel region, wherein the first side and the second side are pivotable with respect to one another;
an imaging device disposed on the first side; and
a processor configured to select either the first pixel region or the second pixel region for displaying a viewfinder for the imaging device, wherein:
if an input from a user interface corresponds to a self-portrait mode, the processor selects the first pixel region, and
if the input from the user interface corresponds to a scenery mode, the processor selects the second pixel region.

5. An electronic device comprising:
a first side having a first pixel region;
a second side having a second pixel region, wherein the first side and the second side are pivotable with respect to one another;
an imaging device disposed on the first side; and
a processor configured to select the first pixel region for displaying a viewfinder, to receive data from a sensor indicating that the electronic device is being rotated, and in response to the data, to select the second pixel region for displaying the viewfinder.

6. An electronic device comprising:
a first side having a first pixel region;
a second side having a second pixel region, wherein the first side and the second side are pivotable with respect to one another; and
an imaging device, wherein the electronic device is configured to concurrently display a first instance of a viewfinder for the imaging device in the first pixel region and a second instance of the viewfinder in the second pixel region.

7. The electronic device of claim 6, wherein an orientation of the first instance of the viewfinder and an orientation of the second instance of the viewfinder differ by about 180 degrees.

8. The electronic device of claim 6, wherein the electronic device is configured to display user interface controls for the viewfinder in only one of the first pixel region and the second pixel region.

9. An electronic device comprising:
a first side having a first surface with a first pixel region and a second surface;
a second side having a third surface with a second pixel region and a fourth surface, wherein the first side and the second side are pivotable with respect to one another so that, in a configuration, the first side is back-to-back with the second side so that the second surface faces the fourth surface;
a first imaging device disposed on the first surface;

a second imaging device disposed on the third surface; and a processor, wherein, during a panoramic image operation of the electronic device:
the first side and second side are pivoted with respect to one another,
the first imaging device and the second imaging device independently capture image data,
the processor converts the image data captured by the first imaging device into a first panoramic image,
the processor converts the image data captured by the second imaging device into a second panoramic image, and
the processor creates a third panoramic image based on a combination of the first panoramic image and the second panoramic image.

10. The electronic device of claim 9, wherein:
during the panoramic image operation, the electronic device pivots from a first position to a second position, or from the second position to the first position,
in the first position, the first side and the second side are side-by-side and the first imaging device and the second imaging device face in at least partly a same direction, and
in the second position, the first side and the second side are back-to-back, and the first pixel region and the second pixel region face away from one another.

11. An electronic device comprising:
a first side;
a second side, wherein the first side and the second side are pivotable with respect to one another;
a first imaging device disposed on a surface of the first side;
a second imaging device disposed on a surface of the second side; and
a processor configured to select one or more of the first imaging device and the second imaging device based on an angle between the first side and the second side, wherein:
if the angle between the first side and the second side falls within a first range of angles, the processor selects both the first imaging device and the second imaging device, and
if the angle between the first side and the second side falls within a second range of angles, the processor selects only one of the first imaging device and the second imaging device.

12. The electronic device of claim 11, wherein:
if the angle between the first side and the second side falls within the first range of angles, the processor interprets image data from the first imaging device and image data from the second imaging device together as three-dimensional image data.

13. An electronic device comprising:
a first side having a first surface and a second surface;
a second side having a third surface and a fourth surface;
a hinge configured to pivotably connect the first side and the second side so that, in a configuration, the first side is back-to-back with the second side so that the first surface faces the third surface; and
a display disposed on the second surface, the fourth surface, and across the hinge, the display having a plurality of pixel regions, wherein pixels of a pixel region, of the plurality of pixel regions, associated with a portion of the display disposed across the hinge are configured to be disabled in response to the electronic device being in a dual-user mode.

14. The electronic device of claim 13, further comprising an imaging device disposed on the first side; and
a processor configured to select a first pixel region, of the plurality of pixel regions, to display a viewfinder in a self-portrait mode, and configured to select a second pixel region, of the plurality of pixel regions, to display the viewfinder in a scenery mode.

15. The electronic device of claim 13, further comprising:
an imaging device disposed on the first side;
a processor configured to select a first pixel region, of the plurality of pixel regions, to display a viewfinder in response to the electronic device having a first orientation, and configured to select a second pixel region, of the plurality of pixel regions, to display the viewfinder in response to the electronic device having a second orientation.

16. The electronic device of claim 13, further comprising:
a first display driver for a first pixel region of the plurality of pixel regions; and
a second display driver for a second pixel region of the plurality of pixel regions, wherein the first display driver is configured to drive pixels of the first pixel region at a first frame rate, the second display driver is configured to drive pixels of the second pixel region at a second frame rate, the second frame rate different from the first frame rate.

17. The electronic device of claim 13, wherein at least two pixel regions, of the plurality of pixel regions, overlap.

18. The electronic device of claim 17, further comprising a plurality of display drivers, wherein at least two display drivers, of the plurality of display drivers, are configured to drive all pixels of the at least two pixel regions.

19. The electronic device of claim 13, further comprising an image device disposed on the second surface, wherein the electronic device is configured to display at least one instance of a viewfinder on at least one of the first surface, the second surface, the third surface, or the fourth surface.

20. The electronic device of claim 19, further comprising a processor configured to select, based on a proximity between an object and the electronic device, the at least one instance of the viewfinder.

* * * * *